Dec. 12, 1961 A. N. DE SAUTELS 3,013,159

SIGNAL RESPONSIVE PULSE PRODUCING APPARATUS

Filed Nov. 14, 1956 2 Sheets-Sheet 1

INVENTOR.
ALBERT N. DE SAUTELS

BY Omund R. Dahle

ATTORNEY

Dec. 12, 1961 A. N. DE SAUTELS 3,013,159

SIGNAL RESPONSIVE PULSE PRODUCING APPARATUS

Filed Nov. 14, 1956 2 Sheets-Sheet 2

INVENTOR.
ALBERT N. DE SAUTELS

BY Omund K Dahle

ATTORNEY

United States Patent Office 3,013,159
Patented Dec. 12, 1961

3,013,159
SIGNAL RESPONSIVE PULSE PRODUCING APPARATUS

Albert N. De Sautels, Minneapolis, Minn., assignor to Minneapolis-Honeywell Regulator Company, Minneapolis, Minn., a corporation of Delaware
Filed Nov. 14, 1956, Ser. No. 622,175
18 Claims. (Cl. 307—88.5)

This invention relates to a proportional multivibrator circuit, and more particularly an electronic circuit in which the number of output pulses is related to the magnitude of the input signal.

In control systems there are several ways to control the amount of electrical power applied to a load. One way this can be done is to use a direct current system, in which load power can be controlled by simply changing the voltage applied to it. This method, however, has the serious drawback of requiring direct conductive connections, thus eliminating the use of transformers. Another method employs a variable magnitude alternating current. The method to which the present invention relates, however, uses pulses of substantially constant peak magnitude, and control of power is achieved by varying the number of such pulses per unit time. This method has an advantage of alternating current in that transformers may be used, for example as isolating devices; and, in addition, if the power is ultimately rectified, this rectification can be made more efficient by using essentially rectangularly shaped pulses instead of alternations of a sine wave shape. It is, nevertheless, frequently desirable to use alternating current or direct current in the condition sensing portions of a control system, and a means is therefore required that will produce pulses as described above in response to signals of a sine wave character or other shapes.

It is an object of this invention to provide new and useful electronic circuits in which the output power is related to the input signal magnitude.

Another object of this invention is to provide electronic circuitry whereby the number of output pulses is related to the input signal magnitude.

A still further object of this invention is to provide electronic circuitry whereby output wave forms of substantially constant peak magnitude are produced whenever an input signal exceeds a particular magnitude.

Figure 1:
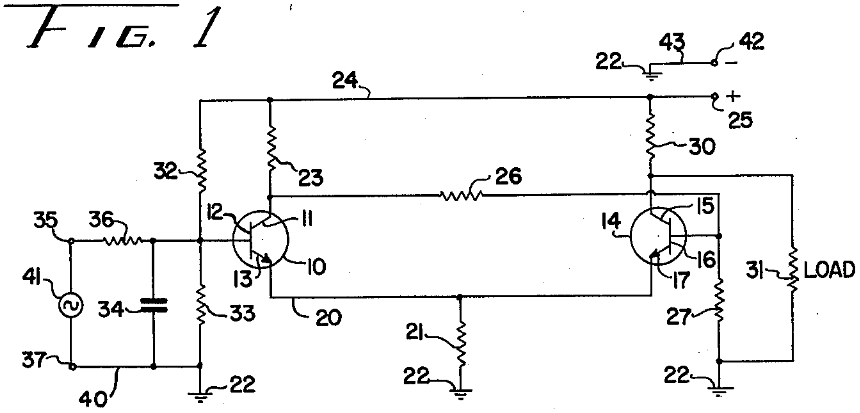
Figure 4:
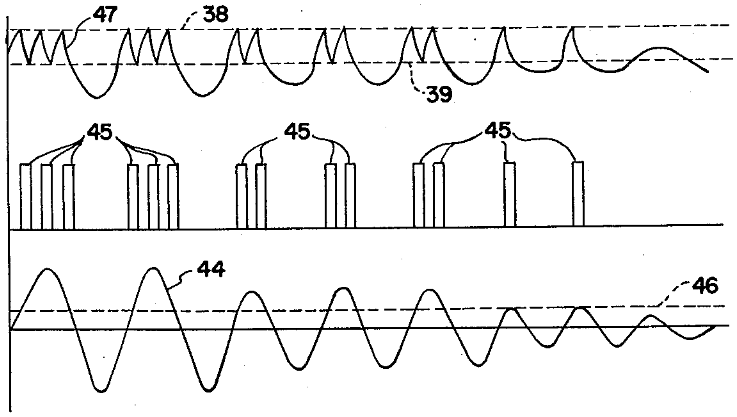
Figure 5:
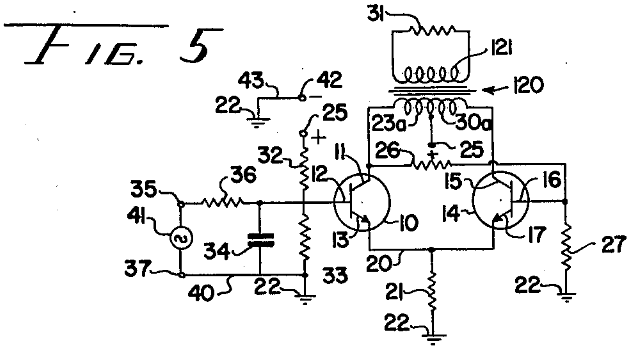
Figure 2:
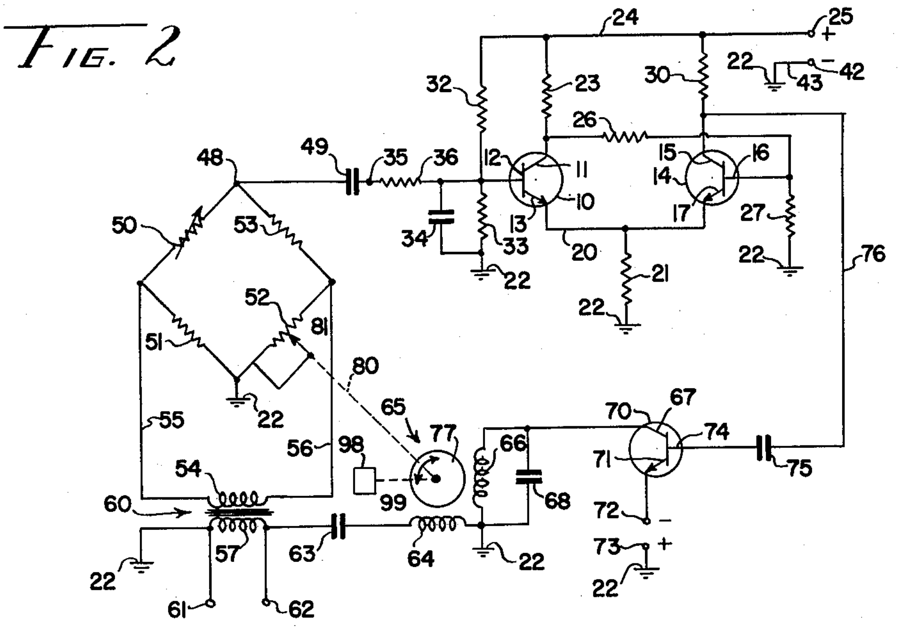
Figure 3:
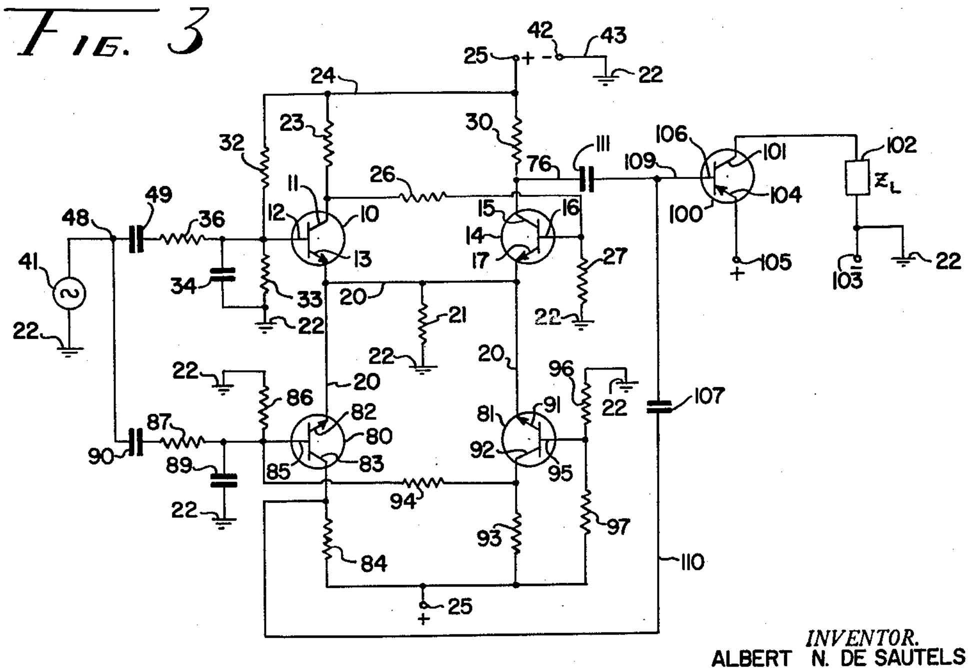

These and other objects of the present invention will be understood upon consideration of the accompanying specification, claims, and drawings of which:

FIGURE 1 is a schematic representation of a proportional multivibrator circuit embodying the invention, FIGURE 2 is a schematic representation of a control system embodying the invention, FIGURE 3 is a modification and extension of FIGURE 1, FIGURE 4 is a pictorial representation of representative voltage wave forms appearing in the circuit of FIGURE 1, and FIGURE 5 is a modification of FIGURE 1.

Referring now to FIGURE 1 there is shown a transistor 10, which may be, for example, an NPN junction transistor, which has a collector electrode 11, a base electrode 12 and an emitter electrode 13. Also shown is another transistor 14, which may be of the same type as transistor 10, having a collector 15, a base 16, and an emitter 17. Emitter 13 is connected through conductor 20 to emitter 17. Conductor 20 is connected through resistor 21 to common point 22, collector 11 is connected through resistor 23 to conductor 24 which is connected to power terminal 25. Collector 11 is also connected to base 16 through resistor 26, and base 16 is connected to common point 22 through resistor 27. Collector 15 is connected through resistor 30 to conductor 24, and collector 15 is also connected through load resistor 31 to a common point 22. Base 12 is connected to conductor 24 through resistor 32 and to common point 22 through resistor 33. Also connecting base 12 to common point 22 is capacitor 34. Base 12 is connected to input terminal 35 through resistor 36, and common point 22 is connected to input terminal 37 by conductor 40. Across input terminal 35 and 37 is placed the input signal source 41. In addition, a second power terminal 42 is connected to common point 22 through conductor 43.

FIGURE 4 shows a pictorial representation of an input voltage and an output voltage shown with the same time axis. The curves 44 and 45, respectively, represent those voltages appearing across input terminals 37 and 35, and across load 31 from common point 22 to collector 15 of FIGURE 1. The input voltage 44 is shown as a sine wave, and output voltage 45 is shown as bursts of voltage pulses. Reference level 46 represents the signal input triggering level of the input voltage of the circuit in FIGURE 1, at which output voltage waveforms will be produced. FIGURE 4 also shows a representation of the voltage 47 across capacitor 34 which is also the voltage from common point 22 to base 12 of transistor 10 in FIGURE 1. Reference level 38 represents the value of voltage 47 at which transistor 10 will, as explained below, change from a relatively non-conducting state to a relatively heavily conducting state; reference level 38 will hereinafter be referred to as the internal triggering level. Reference level 39 represents the value of voltage 47 at which transistor 10 will return to a relatively non-conducting state, as explained below; reference level 39 will hereinafter be referred to as the internal reset level.

*Operation of Figure 1*

In considering the operation of the circuit of FIGURE 1 it will be shown how the circuit produces output wave forms of a substantially constant magnitude that depend in number upon the magnitude of the input signal. Of course, however, other amplifying devices and controllable electric valves could replace the transistors, this circuit using transistors, is so arranged that with zero voltage across input terminals 35 and 37 of a switching circuit transistor 10 will be in a relatively non-conducting state, and that transistor 14 will be in a relatively heavily conducting state. This operating condition is accomplished by choosing resistors 32 and 33 so that the voltage on base 12 is less positive than the voltage on emitter 13 of transistor 10. In this way transistor 10 is biased, since it is shown as a NPN type, so that relatively little current can flow from collector 11 to emitter 13. Resistors 23, 26, 27 and 21 are chosen to tend to make base 16 normally more positive than emitter 17 of transistor 14. Current therefore flows from power terminal 25 through conductor 24, through resistor 30, from collector 15 to emitter 17, through conductor 20 and resistor 21 to common point 22, which is connected to the other power terminal 42 by conductor 43. Should signal voltage 41 be large enough, however, and of correct polarity, capacitor 34 will tend to be charged through resistor 36 and conductor 40, with capacitor 34 and resistor 36 acting as an integrating network, until the internal triggering level is reached, the internal triggering level being the voltage at which base 12 becomes slightly more positive than emitter 13, and transistor 10 is biased to a more conductive state and therefore begins to conduct more current from collector 11 to emitter 13. When this point is reached the increasing current through resistor 23, will cause an increased voltage drop across resistor 23. This will make collector 11 less positive and the total voltage across resistors 26 and 27 will be reduced, thereby also making base 16 less positive. When base 16 becomes less positive the conduction of transistor 14 from collector 15 to emitter 17 will be reduced, and, since this current flows through conductor 20 and through resistor 21 to common point 22, the voltage drop across resistor 21 will tend to be reduced. As a result, conductor 20 which is connected to emitter 13 will tend to become less positive. This will, of course, increase the conduction from collector 11 to emitter 13 of transistor 10, for when emitter 13 becomes less positive, base 12 becomes relatively more positive with respect of emitter 13, which for an NPN transistor, as shown, will increase the collector to emitter conduction. This further increase in conduction of transistor 10 will cause a still greater voltage drop across resistor 23, and it can now be seen that there is positive feedback between transistors 10 and 14. A very rapid change of condition will take place as a result, and transistor 10, which was initially relatively non-conducting will reach a saturation point where it is relatively heavily conducting; and transistor 14, which was initially relatively heavily conducting, will rapidly reach a stable state where it is conducting relatively little.

It should be noted, however, that when transistor 10 changes from a non-conducting to a heavily conducting state, considerably more current than before will flow from base 12 to emitter 13, and that a considerable portion of this current will come from capacitor 34. A current will tend to flow from capacitor 34 to base 12 to emitter 13 through conductor 20 and resistor 21 to common point 22, at which point we have completed the circuit to the other side of capacitor 34. This additional current drain on capacitor 34 when transistor 10 is in a heavily conducting state will lower the voltage across capacitor 34 and will therefore lower the voltage on base 12 to the internal reset level. At this point the voltage on base 12 tends to become less positive than emitter 13, the current from collector 11 to emitter 13 tends to be reduced, and since this current flows through resistor 23 the voltage drop across resistor 23 will become smaller, thereby making collector 11 more positive. This positive change in voltage will be reflected through resistor 26 to base 16 and will tend to increase the current from base 16 to emitter 17, through conductor 20 and resistor 21 to common point 22. Increased current in resistor 21 will make conductor 20, which is connected to emitter 13, more positive, and transistor 10 will then conduct still less current from collector 11 to emitter 13 through resistor 23, and collector 11 will become even more positive than before. Again, a positive feedback loop has been established, and the transistor 10 and 14 will again rapidly change conducting states so that transistor 10 will be essentially non-conducting and transistor 14 will again be relatively heavily conducting. When transistor 10 becomes relatively non-conducting, however, impedance from base 12 to emitter 13 will again become much greater, so that capacitor 34 will, if the signal voltage 41 is still large enough, recharge and repeat the cycle considered above.

The output to load 31 is shown, in FIGURE 1, as coming from common connection 22 and collector 15 of transistor 14. An output, of course, could be taken from common point 22 and collector 11 of transistor 10, or across other elements of the circuit if desired. As shown in FIGURE 1, however, the output voltage fed to load 31 will depend upon the voltage drop in resistor 30, and this voltage drop will change abruptly as transistor 14 alternates between a relatively non-conducting and a relatively heavily conducting state. Thus, when transistor 14 is conducting heavily from collector 15 to emitter 17 a current path is formed from power input terminal 25 through part of conductor 24, through resistor 30 to collector 15, to emitter 17, through part of conductor 20, through resistor 21 to common point 22, and through conductor 43 back to the other power input terminal 42. A large voltage drop will then be established across resistor 30 and collector 15 will be less positive than when transistor 14 is in a non-conducting state.

To further clarify the operation of FIGURE 1, reference is made to FIGURE 4, which is a representation of input and output voltages and voltage of base 12 with respect to common point 22 of the circuit of FIGURE 1. Curve 44 represents a sine wave input voltage, pulses 45 represent the voltage across load 31, and curve 47 represents the above mentioned voltage of base 12 of FIGURE 1. Line 46 represents the signal input triggering level, at which point the circuit of FIGURE 1 will oscillate. Line 38 represents the internal triggering level of the switching circuit proper and line 39 represents the internal reset level, both explained above. It can be seen, then, that the greater the magnitude of signal input voltage 44 the greater will be the portion of the positive half cycle during which output pulses 45 will be produced. If, on the other hand, signal 44 becomes smaller, the bursts of output pulses 45 will become shorter and shorter, until, upon signal input 44 becoming lower than the signal input triggering level 46, no output pulses will be produced. In this way the power to load 31 will be controlled by changing the number of individual output wave forms per cycle of signal potential rather than their peak magnitude.

To control the load power smoothly, of course, requires that the frequency of the output pulses 45, when produced, be relatively much higher than the frequency of an A.C. signal input voltage 41. The length and low frequency of pulses 45 in FIGURE 4 is used only for ease of illustration, and reference to the successful embodiment in this specification will show a much higher frequency used in practice.

The frequency or repetition rate of the output wave forms is determined largely by the electrical sizes of capacitor 34, resistor 36, resistor 21, and the characteristics of transistors 10 and 14. To increase the frequency, for example, capacitor 34, a timing capacitor, could be made smaller or resistor 36 could be made smaller. To decrease the frequency, capacitor 34 could be made larger or resistor 36 could be made larger. In addition, increasing the size of resistor 21 would decrease the frequency, or decreasing resistor 21 would increase the frequency; however, proportionate changes in resistors 23, 26, 27, 32, and 33 would have to be made in this case to maintain the desired biasing of transistors 10 and 14. It will be noted that the above mentioned frequency changes, or oscillation timing changes, result either from changing the length of each individual pulse or by changing the time between individual pulses. In short, then, a change in the circuit that increases the charging time of capacitor 34, or the time constant of its charging path, will increase the time between individual pulses; while any change in the circuit that increases the discharging time of capacitor 34 will increase the width of the individual pulses.

In one successful embodiment of the invention as shown in FIGURE 1 the following components were used:

| | |
|---|---|
| Voltage between terminals 42 and 25 volts D.C. | 30 |
| Resistor 21 ohms | 190 |
| Resistor 23 do | 3900 |
| Resistor 26 do | 2300 |
| Resistor 27 do | 3000 |
| Resistor 30 do | 630 |
| Resistor 32 do | 215 |
| Resistor 33 do | 220,000 |
| Resistor 36 do | 8700 |
| Capacitor 34 mfd | 0.005 |
| Transistor: Texas Instrument 903, Silicon 150 MW. | |
| Frequency rate of output pulses, approximately c.p.s. | 50,000 |

*Figure 2*

FIGURE 2 is a representation of a control system embodying the invention. A portion of the circuit is identical with that shown in FIGURE 1 and the corresponding components carry the same identifying numerals as in FIGURE 1. Only the components not previously considered will be discussed.

In this circuit the input signal placed from common point 22 to input terminal 35 is obtained from a bridge comprising a condition responsive resistor 50, a fixed resistor 51, a variable resistor with provision for readjusting 52, and a fixed resistor 53. The output at the junction 48 between resistors 50 and 53 of this bridge circuit is shown to be fed to input terminal 35 through capacitor 49. However, capacitor 49 is inserted here only to prevent the flow of direct current, and can be omitted in many cases when this feature is not required. The bridge is energized with A.C. voltage from transformer secondary winding 54 through conductors 55 and 56 to the junction of resistors 50 and 51 and the junction of resistors 52 and 53, respectively. The primary winding 57 of transformer 60 is connected to A.C. power terminals 61 and 62, and terminal 61 is also connected directly to common point 22. Terminal 62 is connected to capacitor 63 and the opposite side of capacitor 63 is connected to power winding 64 of two phase motor 65. The other end of winding 64 is connected to common point 22. Signal winding 66 of two phase motor 65 is connected between common point 22 and collector 67 of transistor 70, the emitter 71 of transistor 70 is connected to power terminal 72 and the companion power terminal 73 is connected to common point 22. The rotor 77 of motor 65 is connected by driving means 80 to adjustment 81 on resistor 52 and is also connected by driving means 99 to load 98. The signal input to the base 74 of transistor 70 comes through capacitor 75 and conductor 76, which is connected to collector 15 of transistor 14.

*Operation of Figure 2*

In considering the operation of FIGURE 2, it will be noted that the operation of that portion of the circuit identical to FIGURE 1 will be the same as the circuit of FIGURE 1. One can easily see, then, that the circuit including transistors 10 and 14 will be able to have an output of bursts of pulses, the overall envelope of which will be either in phase with, or 180° out of phase with the voltage applied to transformer winding 57 of transformer 60. This will be true because the circuit including transistors 10 and 14 will put out bursts of pulses on conductor 76 whenever the voltage between common points 22 and input terminal 35 exceeds the previously mentioned triggering level. This voltage can exceed the triggering level only during the positive half cycle of the voltage appearing at the output of the bridge across common point 22 and junction 48. This positive half cycle may be in phase or out of phase with the voltage across transformer winding 57, depending upon which way the bridge is unbalanced. Of course, when the bridge is in balance no voltage will appear across common point 22 and junction 48. In addition, the number of pulses in each burst appearing on conductor 76 will depend upon the amount of unbalance in the bridge, for the greater the unbalance the greater will be the voltage appearing across common point 22 and junction 48.

Assume now that a positive pulse appears on conductor 76. Since base 74 of transistor 70 is connected through capacitor 75 to conductor 76, the base 74 will become more positive during the pulse. This will cause transistor 70, which is shown as a NPN type, to have a current from base 74 to emitter 71, and a heavy current will flow from collector 67 to emitter 71 through a power source connected to terminals 72 and 73, to common point 22 and through control winding 66 of two phase motor 65 back to collector 67. Now, if a burst of positive pulses appears on conductor 76, a burst of current pulses will go through power winding 66. Since the overall envelope of these bursts of current pulses will be either in phase or 180° out of phase with the voltage across transformer winding 57, they will either lead or lag the current going through power winding 64, for power winding 64 is connected from common point 22 to the A.C. power input terminal 61, and the other end of transformer winding 64 is connected through phase shifting capacitor 63 to the other A.C. power input terminal 62. The phase shifting capacitor 63 will cause the current in power winding 64 to lead the voltage across A.C. power input terminals 61 and 62 by a large angle, up to a maximum of 90 degrees. The currents, therefore, in windings 64 and 66 will have a large enough phase angle between them to operate the two phase motor 65. Rotor 77 will turn in one or the other direction, depending upon which half cycle causes bursts of pulses to appear on conductor 76. Capacitor 68 can be connected as shown across control winding 66, if desired, to improve the wave shape of the current flowing through this winding. Rotor 77 is connected by means 80 to adjustment 81 on resistor 52 so that, when a condition change causes condition responsive resistor 50 to unbalance the bridge, the motor 65 will turn in the correct direction to move adjustment 81 on resistor 52 in the direction that will rebalance the bridge. The system therefore represents a complete control loop, and can be used as an indicating device, as a power control device, or in many other applications. It is obvious that one could connect equipment to be controlled to motor 65 in a great variety of ways, and that motor 65 could be replaced by other electro-mechanical transducers. In addition, the pulse output on conductor 76 could be used in many other ways obvious to one skilled in the art.

*Figure 3*

FIGURE 3 shows a representation of a circuit that is a modification and an extension of the circuit in FIGURE 1. Those elements in FIGURE 3 that are the same as those in FIGURE 1 will be denoted by the same numerals and will not be further explained here. In addition to those elements mentioned in FIGURE 1, the circuit of FIGURE 3 has two more transistors 80 and 81. Transistor 80 has an emitter 82 connected to conductor 20, a collector 83 connected through resistor 84 to power supply terminal 25, and a base 85 which is connected through resistor 86 to common point 22 and which is also connected through resistor 87 to one side of capacitor 90, the other side of which is connected to terminal 48. Base 85 is also connected through capacitor 89 to common point 22. A signal source 41 is connected between terminal 48 and common point 22. In addition, a capacitor 49 is connected between point 48 and one end of resistor 36, the other end of resistor 36 being attached, as in FIGURE 1, to base 12 of transistor 10. Transistor 81 has emitter 91 connected to conductor 20. Collector 92 is connected through resistor 93 to power terminal 25, and collector 92 is also connected through resistor 94 to base 85 of transistor 80. The base 95 of transistor 81 is connected through resistor 96 to common point 22 and is also connected through resistor 97 to power terminal 25. Another transistor 100 has a collector 101 connected through load impedance 102 to a power terminal 103, which is also connected to common point 22. Transistor 100 also has an emitter 104 which is connected directly to power terminal 105; it also has a base 106 which is connected through conductor 109 to capacitor 107, and from there by conductor 110 to collector 83 of transistor 80. Base 106 is also connected through capacitor 111 and conductor 76 to collector 15 of transistor 14.

*Operation of Figure 3*

It will be noted that this circuit operates, in many respects, in a manner similar to the circuitry in FIGURE 1. In the circuit of FIGURE 3, transistors 10 and 81 are biased to a normally conducting state, and transistors 14 and 80 are biased to a normally non-conducting state. If, then, a positive voltage of sufficient magnitude appears at input terminal 48, this voltage appearing on base 12 of transistor 10 will have no effect on the conduction of transistor 10, since transistor 10 is already conducting as much as possible; however, this same signal voltage appearing on base 85 of transistor 80 will cause current to flow from base 85 to emitter 82, and consequently a larger current will flow from collector 83 to emitter 82. This latter current also flows through conductor 20 and resistor 21 to the common point 22. Conductor 20, then, will become more positive, as will emitter 13 of transistor 10 and emitter 91 of transistor 81, which are connected directly to conductor 20. The positive change in voltage on these emitters will tend to reduce their respective collector to emitter currents, and their respective collectors 11 and 92 will therefore become more positive. This positive change will be reflected through resistors 26 and 94, respectively, to bases 16 and 85. Due to this positive change on their respective bases, transistors 14 and 80 will tend to conduct more heavily, a very fast change in the conducting state of all four transistors will therefore take place due to this large positive feedback, and those transistors that were initially conducting heavily will now be non-conducting, and vice versa. At this point an action very similar to that of the circuit in FIGURE 1 will take place; that is, capacitor 34 will be charging through resistor 36, and the voltage on base 12 will approach internal triggering level. At the same time, capacitor 89, will be discharging through the low base to emitter impedance of transistor 80, through conductor 20, resistor 21, and back to common point 22. The voltage on base 85 will thus approach the internal reset level, and the transistors will flip back to their original conducting state, just as in the circuit of FIGURE 1. The circuit of FIGURE 3, however, will also operate upon sufficient negative voltage appearing at terminal 48, for this negative voltage will charge capacitor 34 negatively through resistor 36 and capacitor 49, and will initiate a pulse by starting to change transistor 10 from its normally conducting state to a relatively non-conducting state. The resistor 21, which is common to all four emitters will serve as before to cause a change in current in any of the transistors to be reflected to the emitters of all four transistors, thereby causing all four transistors to switch conducting states simultaneously.

The action of FIGURE 3, then, will be to produce output pulses on both half cycles of a sufficiently large alternating current input signal. By eliminating capacitors 49 and 90 the circuit will also operate on a direct current signal of either polarity. It should be noted that since transistor 14 is normally relatively non-conducting, collector 15 and conductor 76 will become more negative during an output pulse, so that the output pulses on conductor 76 will be negative. The same is true of transistor 80 from which output pulses are also taken by conductor 110 from collector 83, for transistor 80 is also normally non-conducting. The output pulses fed to capacitors 111 and 107 will both be negative, and will occur at the same time, and so will have an additive effect on conductor 109, which is connected to base 106 of transistor 100. The large negative pulses that will appear on base 106 will switch transistor 100 from a normally non-conducting state to a conducting state, since transistor 100 is shown as an PNP transistor. Large current pulses will therefore go from supply terminal 105 through emitter 104 and collector 101, through load 102, and back to supply terminal 103. Since the circuit of FIGURE 3 will have bursts of pulses on both the positive and negative half cycles of an alternating current input and the simultaneous pulses of conductors 76 and 110 tend to add, the output power on conductor 109 can be as much as four times that obtainable from the circuit of FIGURE 1, if both circuits have equal parameters otherwise. The output of the circuit of FIGURE 3 is still dependent upon the magnitude of the input potential, as before in FIGURE 1.

*Figure 5*

FIGURE 5 is a further modification of the circuit portrayed in FIGURE 1. Most of the circuit is identical with that shown in FIGURE 1 and the corresponding components carry the same identifying numerals as in FIGURE 1.

In this circuit the load 31 is energized from the secondary winding 121 of transformer 120. The center tapped primary winding is made up of winding 23*a* and winding 30*a*. Here, winding 23*a* replaces resistor 23 of FIGURE 1, and winding 30*a* replaces resistor 30 of FIGURE 1. The operation of this circuit, is therefore, similar to the operation of the circuit in FIGURE 1, except that the load 31 is here coupled to the circuit by means of transformer 120.

An advantage of this transformer coupling becomes evident when one considers that transistors 10 and 14 are interchanging operating conditions simultaneously. That is, when the current through collector 11 rapidly increases, the current through collector 15 rapidly decreases. These opposite changes in the currents through primary windings 23*a* and 30*a* will have an additive effect, and the magnitude of the signal induced in load 31 can therefore be twice as large as the analogous signal in the circuit of FIGURE 1. The control of this power output signal, of course, still depends upon the signal input 41 in the same manner as in the circuit of FIGURE 1.

Many changes and modifications of this invention will undoubtedly occur to those who are skilled in the art and I therefore wish to be understood that I intend to be limited by the scope of the appended claims and not by the specific embodiment of my invention which is disclosed herein for the purpose of illustration only.

I claim:

1. Control apparatus comprising; a source of signal potential of variable magnitude; an electronic switching circuit having input terminals and output terminals, said switching circuit being operable to either of two conditions upon suitable signal potential being applied across said input terminals, and establishing a discrete output potential for each of said conditions; circuit means including biasing means and electric timing means continually connected to the input terminals of said switching circuit, said biasing means normally biasing said switching circuit to a first of said conditions, means connecting said electric timing means to said source of signal potential, said timing means modifying said alternating signal potential whereby said modified signal potential causes said switching circuit to be operated to a second of said conditions; and low impedance means in said switching circuit, said low impedance means being effectively connected across said input terminals and said timing means upon said switching circuit being operated to said second condition and said modified signal potential being thereby exponentially reduced to cause said switching circuit to revert to said first condition.

2. Control apparatus for producing output pulses in response to an input signal comprising: an integrating network having an electrical output dependent on a signal input potential and time, said output being decreased exponentially upon being connected to a relatively low impedance; a source of variable signal input potential connected as an input to said integrating network; a switching circuit having an input circuit and an output circuit, and having a first state, prevailing at low input potential and providing high input impedance, and a second state, prevailing at relatively higher input potential and providing said relatively low input impedance, each state establishing a discrete output potential; and means connecting the output of said integrating network directly across the input of said switching circuit, so that, upon presence of sufficient signal input potential, the output of said integrating network alternately increases and decreases by interaction with said switching circuit, thus causing said switching circuit to produce a constant magnitude pulse output, the number of said output pulses depending upon the magnitude of said input signal.

3. A proportional multivibrator comprising: first and second transistors, each of said transistors having a plurality of electrodes including a base electrode, an emitter electrode, and a collector electrode; a power source having a first and a second terminal; first impedance means connecting each of said collectors to said first terminal; second impedance means connecting the collector of said first transistor to the base of said second transistor; first conductive means connected intermediate said emitters; third impedance means connecting said emitters to the second terminal of said power source; bias means connected to said bases and said emitters to normally bias said first transistor to a substantially non-conductive state and said second transistor to a conductive state, said transistors being operable to interchange said states upon application of a sufficient potential on the base of said first transistor, and said interchange of states lowering the input impedance from the base to the emitter of said first transistor; a source of signal input potential of variable magnitude; capacitive timing means continually connected directly between the base of said first transistor and one of said power source terminals; fourth impedance means connecting said signal input potential in controlling relation to the base of said first transistor, so that said capacitive means tends alternately to be charged through said fourth impedance means until said interchange of states is affected and discharged exponentially due to the resulting lowered input impedance from the base to the emitter of said first transistor, thus, upon sufficient magnitude of said signal input potential, producing an alternating output signal in the collector circuitry of said transistors; load means; and means coupling said collector circuitry in energizing relation to said load means, whereby said load means is energized in accordance with the magnitude of said signal input potential.

4. A proportional multivibrator comprising: first and second controllable electrical valves having a plurality of electrodes including first and second input electrodes and first and second output electrodes; a power source having a first and a second terminal; first impedance means connecting each of said first output electrodes to said first terminal; means connecting said second output electrodes to said second terminal; second impedance means connecting the first output electrode of said first valve to the first input electrode of said second valve; first conductive means connected intermediate the second input electrodes of said first and second valves; third impedance means connecting said second input electrodes to the second terminal of said power source; bias means connected to said input electrodes to normally bias said first valve to a substantially non-conductive state and said second valve to a conductive state, said valves being operable to interchange said states upon application of a sufficient signal on the first input electrode of said first valve, and said interchange of states lowering the input impedance of said first valve; a source of input signal of variable magnitude; capacitive timing means continually connected directly between the first input electrode of said first valve and one of said power source terminals; fourth impedance means connecting said input signal in controlling relation to the input terminals of said first valve, so that said capacitive means tends alternately to be charged through said fourth impedance means until said interchange is affected and discharged exponentially due to the resulting lowered input impedance of said first valve, thus, upon sufficient magnitude of said input signal, producing an alternating output signal in the output circuitry of said valves; load means; and means coupling said output circuitry in energizing relation to said load means, whereby said load means is energized in accordance with the magnitude of said input signal.

5. A proportional multivibrator comprising: first and second amplifying devices each having a plurality of electrodes including an input electrode, an output electrode, and a common electrode, said common electrode being common to the input and output of said device; a power source having a first and a second terminal; first impedance means connecting each of said output electrodes to said first terminal; second impedance means connecting the output electrode of said first device to the input electrode of said second device; first conductive means connected intermediate said common electrodes; third impedance means connecting said common electrodes to the second terminal of said power source; bias means connected to said input electrodes and said common electrodes to normally bias said first device to a substantially inoperative state and said second device to an operative state, said devices being operable to interchange said states upon application of a sufficient potential on the input electrode of said first device, and said interchange of states lowering the input impedance of said first device; a source of input signal of variable magnitude; capacitive timing means continually connected directly between the input electrode of said first device and one of said power source terminals; fourth impedance means connecting said input signal in controlling relation to the input electrode of said first device, so that said capacitive means tends alternately to be charged through said fourth impedance means until said interchange of states is effected and discharged exponentially due to the resulting lowered input impedance of said first device, thus, upon sufficient magnitude of input signal, producing an alternating output signal; load means; and means coupling said output electrode circuitry in energizing relation to said load means, whereby said load means is energized in accordance with the magnitude of said input signal.

6. Control apparatus comprising: a switching circuit having input and output circuits, and having a first operating condition providing a high input impedance, and being operable to a second condition by sufficient input potential, said second condition providing a relatively low input impedance, and each of said conditions establishing a discrete output potential; and signal potential integrating means, including capacitive means directly connected in parallel relationship to the input of said switching circuit, and also including impedance means connected in series relation to the input of said switching circuit, the output signal of said integrating means being reduced exponentially by said low impedance of said second condition; and a source of variable signal potential connected as an input to said integrating means, so that, upon presence of a suitable signal potential, the output of said integrating means alternately increases and decreases by interaction with said switching circuit, thereby causing said switching circuit to produce a constant magnitude alternating pulse output, the number of said output pulses being dependent upon the magnitude of said input signal.

7. A control system comprising: a switching circuit having input and output circuits, and having a first operating condition providing a high input impedance, and being operable to a second condition by a sufficient input potential, said second condition providing a relatively low input impedance, and each of said conditions establishing a discrete output potential; signal potential integrating means, including signal input means, and having a signal output connected directly across the input of said switching circuit, said signal output being reduced exponentially by said low impedance of said second condition, so that, upon presence of a suitable signal potential, the output of said integrating means alternately increases and decreases by the interaction with said switching circuit, thereby causing said switching circuit to produce an alternating pulse output; condition responsive means, including readjusting means, and having an alternating electrical signal output connected to the signal input means of said integrating means; and an electro-mechanical transducer connected in energizable relation to the output circuit of said switching circuit, said transducer also being mechanically connected in controlling relation to said readjusting means, so that a change in condition causes said transducer to be energized by bursts of pulses and move said readjusting means to rebalance said control system, said bursts of pulses having fixed phase relation to said alternating electric signal.

8. A control circuit including: an electricl triggering circuit having input and output terminals and being controllable, upon a signal input potential reaching uppet and lower triggering potentials, to first and second operating conditions, respectively, said first condition providing a relatively low input impedance and said second condition providing a relatively high input impedance, and each of said conditions providing a discrete output potential; a source of control voltage of variable magnitude; oscillation timing means connected intermediate said source and said input terminals comprising impedance means connecting said source to said input terminals, and capacitive means continually connected directly across said input terminals, said capacitive means alternately being charged, upon the magnitude of said signal potential being sufficient, to said upper triggering potential through said impedance means and, upon said triggering circuit being operated to said first condition, being discharged exponentially to said lower triggering potential through said relatively low input impedance of said input terminals, thereby returning said triggering circuit to said second condition, and thus producing an alternating output; and load means connected to said output terminals, said load means being energized by said alternating output in accordance with said control voltage.

9. A control system including: an electrical triggering circuit having input and output terminals and being controllable, upon a signal input potential reaching upper and lower triggering potentials, to first and second operating conditions, respectively, said first condition providing lower input impedance than said second condition, and each of said conditions providing a discrete output potential; condition responsive means including readjusting means, said condition responsive means having an alternating electrical signal output; oscillation timing means, connected intermediate said electrical signal output and said input terminals, comprising impedance means connecting said electrical signal output to said input terminals, and capacitive means connected directly across said input terminals, said capacitive means alternately being charged to said upper triggering potential through said impedance means upon the magnitude of said alternating electrical signal output being sufficient, and, upon said triggering circuit being operated to said first condition, said capacitive means being discharged to said lower triggering potential through said lowered input impedance of said input terminals, whereupon said triggering circuit reverts to said second condition, thus producing a pulse output comprising bursts of pulses; an electro-mechanical transducer operable by said alternating pulse output; means connecting said output terminals of said triggering circuit to said transducer so that said pulse output controls said transducer; and mechanical means connecting said transducer in controlling relation to said readjusting means, so that a change of condition, by means of said condition responsive means and said electrical triggering circuit, actuates said electro-mechanical transducer to change said readjusting means and thereby establish a rebalance of said control system.

10. Control apparatus for producing an electrical output of bursts of pulses in response to a cyclic signal potential, wherein the quantity of pulses per burst depends upon the magnitude of the cyclic signal potential, comprising: a switching circuit having input and output circuits, and having a first operating condition providing a high input impedance, and being operable to a second condition by a sufficient input potential, said second condition providing a relatively low input impedance, and each of said conditions establishing a discrete output potential; signal potential integrating means of relatively short time constant with respect to a cycle of said cyclic signal potential, said integrating means having an input and having a signal output connected directly across the input of said switching circuit, and the output of said integrating means being reduced exponentially by said low impedance of said second condition; and a source of cyclic signal potential of variable magnitude connected to the input of said integrating means, so that, upon presence of a suitable cyclic signal potential, the signal output of said integrating means, due to interaction with said switching circuit, alternately increases and decreases at a fast rate with respect to a cycle of said cyclic signal potential, thereby causing said switching circuit to produce bursts of output pulses, the number of said pulses being dependent upon the magnitude of said input signal.

11. A proportional multivibrator comprising: first and second controllable electric valves having a plurality of electrodes including first and second input electrodes and first and second output electrodes; a power source having a first and a second terminal; first and second impedance means connecting the first output electrodes of said valves to said first terminal; means connecting said second output electrodes to said second terminal; third impedance means connecting the first output electrode of said first valve to the first input electrode of said second valve; first conductive means connected intermediate the second input electrode of said first and second valves; fourth impedance means connecting said second input electrodes to the second terminal of said power source; bias means connected to said input electrodes to normally bias said first valve to substantially non-conductive state and said second valve to a conductive state, said valves being operable to interchange said states upon application of a sufficient signal on the first input electrode of said first valve, and said interchange of states lowering the input impedance of said first valve; a source of input signal of variable magnitude; capacitive timing means directly connected between the first input electrode of said first valve and one of said power source terminals; fifth impedance means connecting said input signal in controlling relation to the input terminals of said first valve, so that said capacitive means tends alternately to be charged through said fifth impedance means until said interchange is effected and discharged exponentially due to the resulting lowered input impedance of said first valve, thus, upon sufficient magnitude of said input signal, alternating said states in said valves; load means; and means connecting said load means between one of the terminals of said power source and one of said first output electrodes, so that said load means is energized in accordance with the magnitude of said input signal.

12. Apparatus according to claim 3 wherein the first impedance means are resistors.

13. Apparatus according to claim 11 wherein the source of input signal of variable magnitude comprises condition responsive means.

14. Apparatus according to claim 11 wherein the source of input signal of variable magnitude comprises rebalanceable condition responsive means and the load means includes motive means connected to rebalance said condition responsive means.

15. Control apparatus comprising: an electrically energized switching circuit comprising input and output circuits and having a first operating condition providing a high input impedance, and being operable to a second condition by a sufficient potential, said second condition providing a relatively low input impedance, each of said conditions establishing a discrete output potential; signal potential integrating means having a signal input and a signal output, said signal output being connected directly across the input of said switching circuit, the output of said integrating means being reduced exponentially by the low impedance offered by the circuit when in said second condition; and a source of variable magnitude signal connected to said signal input so that, when said variable signal is of suitable potential, the output of said integrating means ultimately increases and decreases by interaction with said switching circuit, thereby causing said switching circuit to produce an output of pulses, the number of said pulses being proportional to the magnitude of said input signal.

16. Control apparatus comprising: timing means having input and output terminals, the input terminals of said timing means being adapted to be connected to a source of input signals of variable magnitude, said timing means producing an increasing output at said output terminals thereof as a function of an input signal applied to said input terminals thereof; switching means having input and output terminals, said switching means being operable from a first condition to a second condition in response to an input signal of predetermined magnitude; and means connecting the output terminals of said timing means to the input terminals of said switching means, the output of said timing means decreasing upon the operation of said switching means to said second condition, said switching means being further characterized by automatically reverting to said first condition from said second condition after the output of said timing means decreases below said predetermined magnitude.

17. Apparatus according to claim 3 wherein the first impedance means comprises a transformer.

18. Apparatus according to claim 3 wherein the first impedance means comprises a center tap transformer primary winding wherein the center tap of said winding is connected to said first terminal and wherein said load means comprises a secondary winding of said transformer.

References Cited in the file of this patent

UNITED STATES PATENTS

| | | |
|---|---|---|
| 2,383,822 | Schlesinger | Aug. 28, 1945 |
| 2,416,158 | Coykendall | Feb. 18, 1947 |
| 2,428,926 | Bliss | Oct. 14, 1947 |
| 2,438,950 | Smith | Apr. 6, 1948 |
| 2,459,852 | Summerhayes | Jan. 25, 1949 |
| 2,486,391 | Cunningham | Nov. 1, 1949 |
| 2,527,342 | White | Oct. 24, 1950 |
| 2,584,954 | Williams | Feb. 5, 1952 |
| 2,615,992 | Flory et al. | Oct. 28, 1952 |
| 2,641,717 | Toth | June 9, 1953 |
| 2,735,011 | Dickinson | Feb. 14, 1956 |
| 2,735,051 | Gille | Feb. 14, 1956 |
| 2,773,220 | Aron | Dec. 4, 1956 |
| 2,801,340 | Keonjian et al. | July 30, 1957 |
| 2,826,696 | Suran | Mar. 11, 1958 |
| 2,827,568 | Altschul | Mar. 18, 1958 |
| 2,827,574 | Schneider | Mar. 18, 1958 |
| 2,845,548 | Silliman et al. | July 29, 1958 |
| 2,935,690 | Bergfors | May 3, 1960 |